Figure 1:
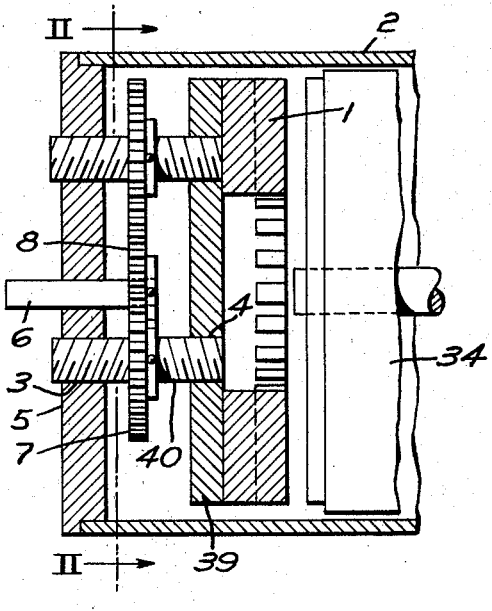

Nov. 18, 1958 W. KOBER 2,861,238
DYNAMO VOLTAGE CONTROL
Original Filed March 27, 1951 3 Sheets-Sheet 1

INVENTOR:
WILLIAM KOBER
BY:
Beau, Brooks, Buckley & Beau,
ATTORNEYS.

Nov. 18, 1958  W. KOBER  2,861,238
DYNAMO VOLTAGE CONTROL
Original Filed March 27, 1951  3 Sheets-Sheet 2
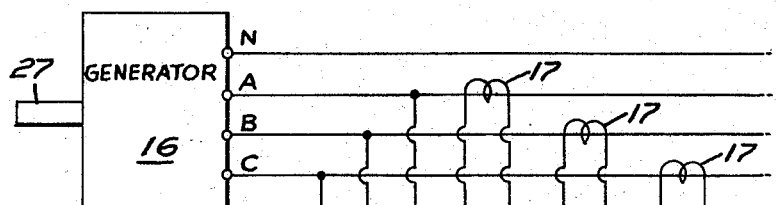
FIG. 3
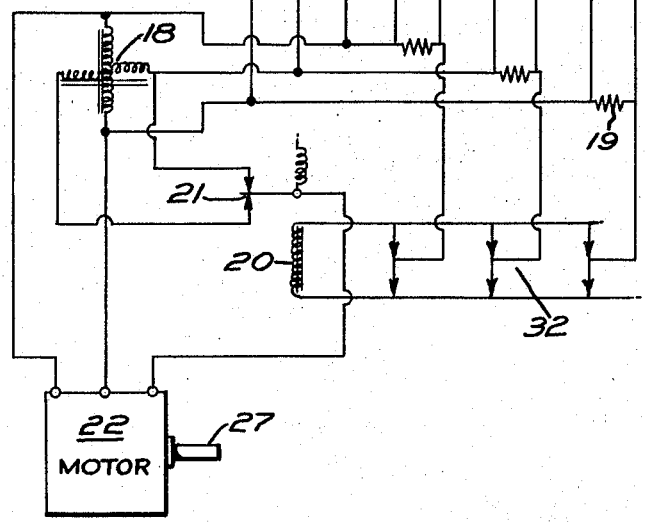
FIG. 4
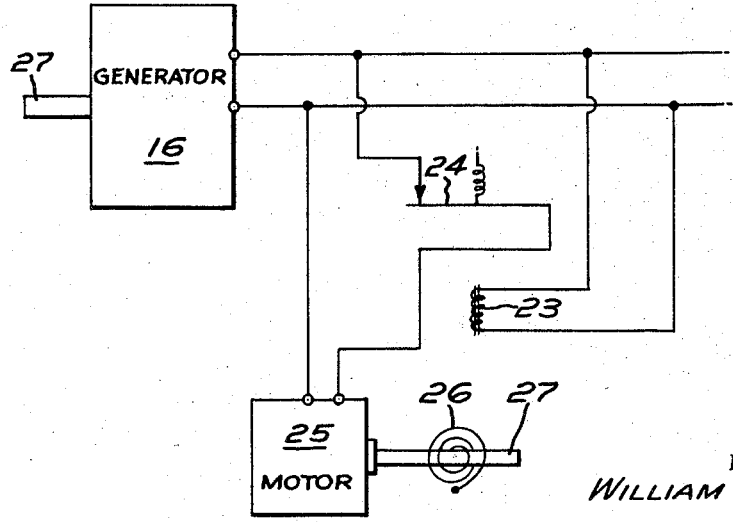
INVENTOR.
WILLIAM KOBER
BY:
Beau, Brooks, Buckley & Beau,
ATTORNEYS.

Nov. 18, 1958    W. KOBER    2,861,238
DYNAMO VOLTAGE CONTROL
Original Filed March 27, 1951    3 Sheets-Sheet 3
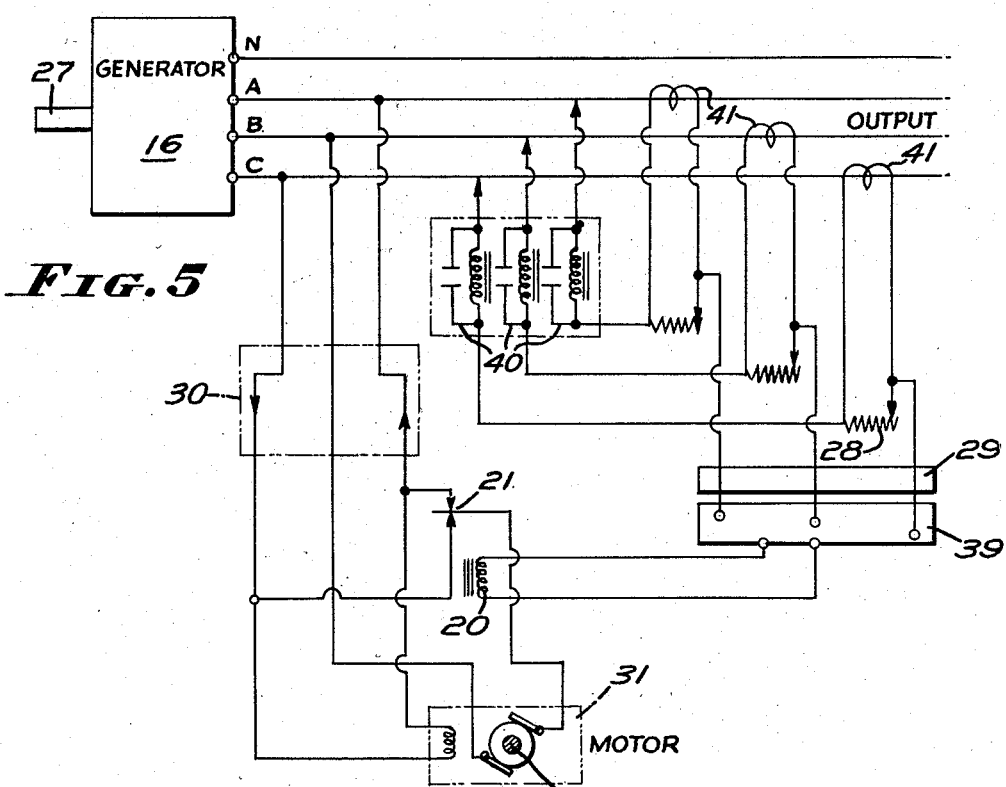
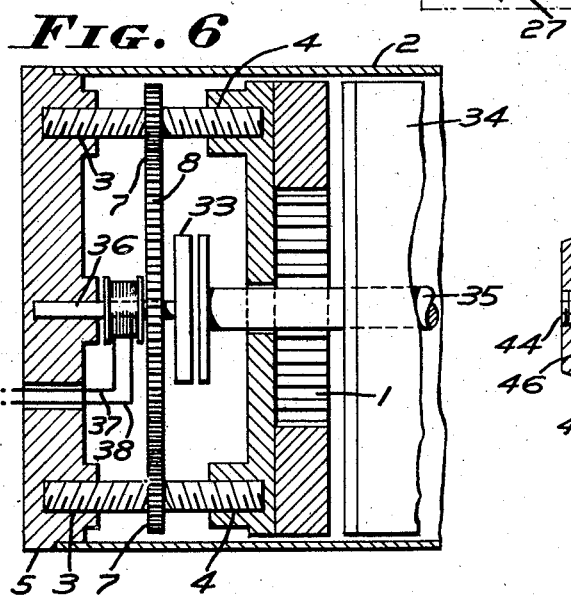
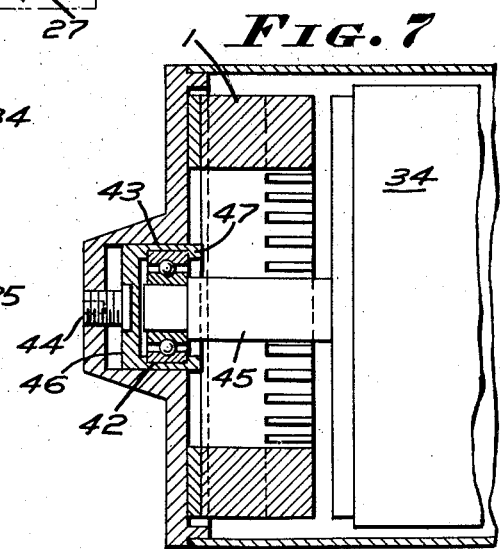
INVENTOR:
WILLIAM KOBER
BY:
Beau, Brooks, Buckley & Beau,
ATTORNEYS.

United States Patent Office  2,861,238
Patented Nov. 18, 1958

2,861,238

DYNAMO VOLTAGE CONTROL

William Kober, Fairport, N. Y.

Original application March 27, 1951, Serial No. 217,799, now Patent No. 2,784,332, dated March 5, 1957. Divided and this application March 1, 1957, Serial No. 643,211

11 Claims. (Cl. 322—46)

The object of this invention is to construct an alternating current generator using a rotating permanent magnet field in such a way that the voltage output can be varied readily, over a wide range. This application is a division of my pending application, Serial No. 217,799, filed March 27, 1951, now Patent No. 2,784,332, dated March 5, 1957.

A further object of this invention is to provide means whereby the voltage of the generator can be varied over a large range without producing any appreciable distortion of the output voltage wave form.

A further object is to provide means whereby the voltage control is automatically operated in a way to keep the output voltage constant with variations in speed and load.

A further object is to operate the voltage control automatically to respond in a desired way to changes in output current and power.

Alternating current generators using fields energized by permanent magnets have a number of advantages over the conventional type of generator, in which the field is excited by an auxiliary current. Some of the more obvious are: elimination of the need for a direct current exciting source, and of brushes and slip rings to conduct the current into the rotor, and reduced heating in the generator resulting from the elimination of field excitation losses. It is also true at this time, because of the perfection of excellent permanent magnet materials, that a given size and weight of permanent magnet field structure will produce more magnetomotive force and more flux than an equal size and weight of electromagnetically excited field.

It is well known that generators of both types will show considerable voltage drops under load increases, particularly when the generators are made for applications where minimum size and weights are essential. Also, generators of both types will change their voltages with changes of speed of rotation, and such changes are often considerable.

With the electromagnetic field type, it has become well-nigh universal practice to overcome these unwanted voltage changes by controlling the field produced through variation of the field exciting current. The resulting regulators are well known, and need no further description here.

With generators using permanent magnet fields, this type of control is obviously not available. In fact, heretofore no satisfactory means for varying the voltage has been available. As a result, such generators have normally been designed to operate on inherent regulation, with the result that the generator either had undesirably large variations in output voltage over a range of load or became much larger in size and weight than would have been required to generate only the maximum available output. Also, the change of voltage with speed could not be corrected.

The control of the voltage of permanent magnet field generators was in fact so difficult that even minor adjustments in original voltage, to compensate for manufacturing variations, were made only with great difficulty.

In this invention, structures of a permanent magnet field generator are disclosed which permit a simple, mechanically rugged means of controlling the output voltage over a large range, either by manual or automatic control. The methods of the invention may also be applied to generators using any type of excitation, as well as to the permanent magnet type.

In constructing a generator, a number of advantages are to be found in using a cylindrical surface on the field structure which faces a cylindrical armature surface across an air gap. These advantages have determined the present standard construction. In such a construction, it is very difficult to control the length of the air gap. However, these considerations do not retain their importance for permanent magnet field construction. A construction in which the field produces its flux on a flat ring, facing an armature similarly shaped across an air gap, has certain important advantages.

It has been discovered that a generator of this type can have its output voltage varied readily by moving the armature small distances directly toward or away from the field. Such motions cause large percentage changes in the air gap, since this is normally small. Since air has a relatively great resistance to the conduction of high density fluxes, relatively small changes in this distance can cause great changes in the flux reaching the armature, and in the generator voltage.

Figure 2:
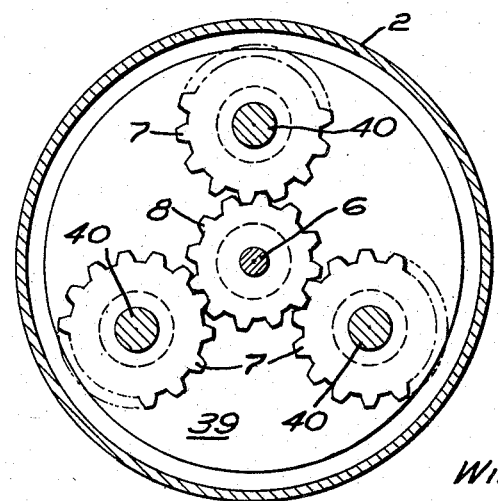

It is the purpose of this invention to disclose structures by which the armature in such a generator can be moved in the above manner, thereby controlling the output voltage. The motion may be applied manually, or by moving devices under the control of automatic voltage controlling circuits. These and other advantages of the invention are described in the following specifications and drawings. In the drawings, Figs. 1–2 show a generator equipped for control of voltage according to the invention. Figs. 3, 4, 5 and 6 show circuits and structures for obtaining automatic voltage control. Fig. 7 shows another generator arrangement for voltage control in accord with the invention.

In Figs. 1–2, the armature 1 is mounted on a holding plate 39 on its rear face (away from the field 34). In this plate, three left-hand screw threads 4 are formed. In the housing facing the armature, three corresponding right-hand threads 3 are formed. Three studs 40, having left-hand threads on one end and right-hand threads on the other are fitted into the armature holding plate and the housing. Each stud has a gear 7 fastened to it, so that a fourth or driving gear 8 engages each one, insuring equal rotation of all three studs, and equal motion of the armature 1 with respect to the housing 5. Initial adjustment so that the stator front face is exactly parallel to the field face at all times is readily achieved by disengaging the fourth gear initially, turning the three stud gears individually until parallelism to the desired degree is achieved, and then engaging all the gears at the nearest meshing point.

By proper choice of pitch diameter and thread of the studs, and of gear ratios, enough motion to control voltage through the useful range can be achieved by only a fractional revolution of the control gear 8 through shaft 6. Alternatively, if desired, a considerable number of such revolutions may be involved. It will be noted that control can be applied through any of the three studs, if allowed to project beyond the housing, as well as by the fourth gear 8 and shaft 6.

If the central regions are to be left clear, the central or fourth gear 8 may be made open internally, i. e., in the form of a ring, in which case it is controlled in position by the three stud gears, and does not need a centering shaft. This gear may also be an external ring, or the gears 7 may be driven by a toothed belt or by sprockets engaging a chain, all as disclosed in my copending application Serial No. 217,799.

Although three studs are a minimum efficient number, it is possible to use four, five, six or more, operated together in a similar manner.

Also, the driving devices for the studs may be on projections behind the housing, instead of between the housing and armature, all as shown in my said copending application, Serial No. 217,799.

For automatic control, the control shaft may be driven by a small motor under the control of voltage, current and power sensitive devices. The motor may be run by D. C. as in Fig. 5, single phase A. C. as in Fig. 4, or polyphase A. C. as in Fig. 3, the latter being preferred, since a small polyphase output can always be taken from the generator for the purpose of powering the motor.

The motor may be driven in two directions, as in Figs. 3 and 5, or in one direction with a spring return, as in Fig. 4. In this latter form, the motor need not be reversible, the spring always tending to return it to the starting point.

Fig. 5 illustrates the system employing a reversible D. C. motor. Since a single pole double throw relay (back and front contact) is more sensitive than a double pole type, it is preferred to use a rectifier which has a center tap, to supply the motor, one simple form of which is shown. It is necessary to draw the motor power from a rectifier independent of the control rectifier, to avoid disturbing this very sensitive circuit. It will be noted that the proper performance of the motor does not depend on any particular constancy of its power supply, hence no special precautions need to be taken in this rectifier circuit.

The operation of Fig. 5 is explained as follows. Suppose that after constant operation at a given speed and load, the speed of the generator suddenly increases, while the load remains constant. The voltage of the generator on lines A, B, C tends to increase. This increase passes through the transformer 29, where a voltage suitable to rectifier 39 is produced. The use of three phase circuits to this point insures an average response if an unbalanced load on the generator causes some difference in the voltage of the individual phases. However, the use of one phase only is obviously possible. Rectifier 39 passes on the increase to relay 20, causing spring 21 to move to the front contact. Relay 20 is designed to have a very small voltage differential between its front and back contacts. The front contact associated with spring 21 closes the armature circuit of motor 31, causing it to rotate shaft 27 (connected to the main generator shaft 27 by means not shown) in such a manner that the generator stator is moved to increase the air gap. This motion continues until the generator output voltage has decreased to its desired value, when relay 20 opens its front contact, and the spring floats free of both contacts. The generator now operates under the new speed condition at its desired substantially constant voltage. If the speed decreases rather than increases, the terminal voltage tends to drop, causing the voltage across relay 20 to drop, causing spring 21 to make its back contact. Motor 31 now rotates in the opposite sense to that described before, since its field polarity is unchanged, but its armature polarity is reversed. As a result, shaft 27 moves the generator stator toward the rotor. This process continues until the voltage returns to normal when spring 21 floats away from its back contact and the motor stops. To prevent overrun of the motor, and consequent surging, sufficient friction may be built into the motor or an automatic magnetic brake may be applied in a manner known to the art.

If the voltage of the generator drops by reason of a load change or alternatively rises by reason of a load change, similar responses correcting the voltage take place. The same holds true for any combination of speed, load or load power factor changes.

The function of current transformers 41 and frequency responsive networks 40 has not yet been described. These are useful when it is desired to over or under correct for voltage changes due to load or frequency changes. Thus, if voltage sensitive equipment is separated from the generator by a long transmission line having considerable resistance and reactance, it may be desirable to over or under correct the voltage at the generator in such a way that the effect of the transmission line is compensated for. The procedure in adjustment of networks 40 and controls 28 requires only ordinary skill.

Fig. 3 shows a system similar to Fig. 5 except that a reversible three phase motor 22 is used to move shaft 27. To reverse the motor on motion from a front contact to a back contact at relay 21, Scott transformer 18, which produces alternative phase rotation on the three phase motor terminals in a well known way is employed.

In Fig. 4, a simpler system suitable for a single phase generator 16 and using a return spring 26 in combination with a single direction drive motor is shown. Here spring 26 always tends to turn control shaft 27 in a direction to reduce voltage. Any actual reduction in terminal voltage, however, causes the back contact of relay 23 to make, driving motor 25 in a direction to increase voltage. Thus, a vibration of the relay contact is established, holding the terminal voltage exactly at the point of making of the contact. It is also possible to operate this system with the spring 26 driving to higher voltage, and the back contact of relay 23 replaced by a front contact. However, on failure, the voltage will rise, a sometimes less favorable result than that given by the previous system in which it drops.

When parallel operation is intended, appropriate interconnections of regulators in the usual way will serve to keep circulating currents in the paralleled generators at a minimum.

Fig. 6 shows a system of automatic control in which the motor is replaced by a magnetic clutch 33 driven by the main generator shaft 35. The clutch may be of the mechanical contact type, of the iron filings type, or preferably of a type in which the torque is produced by magnetic drag across an air gap without any mechanical contact. Operation is analogous to that described for Fig. 4, except that the more delicate D. C. relays 20 of Figs. 3 and 5, and their associated circuits will be preferred.

In the clutch system shown in Fig. 6, it is possible to make the clutch quite sensitive, and sharply responsive in torque to small variations in input voltage. The intermediate relay of Figs. 3, 4 and 5 can then be dispensed with, and the clutch be energized directly by the control voltage, made up in part of voltage, and in part of current and relative phase as in Fig. 5. The voltage supply to clutch 33 now is that going to relay 20 in Fig. 3 or 5. The networks 40 and the adjustments 28 now take on a new function. To secure operation, the springs must drive to higher voltage because the clutch, energized by the control circuit, pulls harder at higher voltage and this harder pull must be directed to correct its cause or to reduce voltage. Thus, at peak loads, the springs will be at their loosest point and less control voltage will be called for causing a reduced terminal voltage. Here then, this system only reduces the effect of load and speed changes but does not neutralize them. However, exact neutralization or even overcorrection may be obtained by use of networks 40, transformers 41 and adjustments 28. The current adjustment 41 and 28 is set to oppose the line voltage tapped from A, B and C. Thus, at high currents, but constant line voltage, the control voltage applied to clutch 33 is reduced. If this reduction is adjusted to the right value, constant voltage at all loads is obtained. By interchanging phases between the current and voltage taps, a similar effect due to changes in load power factor can be neutralized. The frequency responsive networks 40 may be similarly adjusted so that a lower frequency produces an accentuated voltage drop, thus neutralizing the effect of the full range of speeds on voltage. Thus, all effects of changing conditions may be neutralized, giving constant voltage output at the generator terminals under all conditions. This system dispenses with all make and break contacts in the entire generator and control system.

It is often preferred to place the clutch and drive gears in an enclosed lubricated space, leaving the back of the stator free for cooling action. This general plan, shown in Fig. 6 of my pending application, Serial No. 217,799, is obviously adaptable to the clutch system of Fig. 6.

In the above forms, the use of left-hand and right-hand screw threads has been shown to secure parallel motion of the stator. Single threads and a collar may also be used. Additionally, any other parallel motion device, actuated by wedges, cams or levers is available to produce the desired motion when desired.

The relative motion between the stator and the field may also be obtained by moving the field and fastening the stator in fixed relation to the housing. In Fig. 7, the stator 1 is so fastened and rotor 34 is moved toward and away from it by moving bearing 43 on shaft 45 in its outer housing by moving shoulder 42. The motion may be imparted by a screw 44 or by other obvious means. It will be noted that the magnetic attraction between rotor and stator produces an axial force which holds the bearing against shoulder 42. Therefore, the opposing shoulder 47 can be eliminated if desired.

I claim:

1. In a dynamoelectric generator, an armature, a rotating field, said armature and said field having parallel working faces spaced apart along the axis of rotation of said field to provide an axial air gap therebetween, said field producing magnetic flux entering said armature across said air gap, means mounting at least one of said armature and said field for movement relative to the other thereof in the direction of said axis of rotation whereby to change the length of said air gap, said means including position adjusting means operable to so move said one of said armature and said field while at all times maintaining the parallel relation between said working faces, and actuating means for said position adjusting means controlled by the output of said generator for actuating said position adjusting means automatically to maintain a substantially constant generator output.

2. In combination, a dynamoelectric generator having a stator, a rotor mounted for rotation about a predetermined axis, said stator and said rotor having parallel working surfaces spaced apart in the direction of said axis of rotor rotation to provide an axial air gap therebetween, means mounting at least one of said stator and said rotor for movement toward and away from the other thereof in the direction of said axis whereby to vary the length of said air gap, and means for so moving said one of said stator and said rotor automatically in response to variations in an output characteristic of said generator, said last-named means including a motor, an energizing circuit for said motor, and a control circuit for said energizing circuit operable independently thereof in response to such variations to cause energization of said motor to so move said one of said stator and said rotor in a direction to produce a desired generator output characteristic.

3. The combination set forth in claim 2, wherein said motor energizing circuit draws power from the output of said generator.

4. The combination set forth in claim 2, wherein said motor comprises a reversible D. C. motor having constant field polarity, said control circuit being operable to cause said energizing circuit to reverse the armature polarity of said motor.

5. The combination set forth in claim 2, wherein said generator has a polyphase A. C. output, said motor comprises a reversible polyphase A. C. motor, and said energizing circuit draws power from the output of said generator, said control circuit being operable to cause alternative phase rotation in said motor energizing circuit.

6. The combination set forth in claim 2, wherein said control circuit causes energization of said motor in one direction only, and said motor has a spring return.

7. The combination set forth in claim 2, wherein said generator has an A. C. output, and said control circuit includes a D. C. relay in controlling relation to said energizing circuit, and means including rectifier means for energizing said relay in response to variations in the generator output.

8. In combination, a dynamoelectric generator having a stator, a rotor, means including a shaft mounting said rotor for rotation about a predetermined axis, said stator and said rotor having parallel working surfaces spaced apart along said axis to provide an axial air gap therebetween, means mounting at least one of said stator and said rotor for movement toward and away from the other thereof along said axis to vary the length of said air gap, and means for so moving said one of said stator and said rotor automatically in response to variations in an output characteristic of said generator in a direction to produce a desired generator characteristic, said last-named means including coupling means for operatively connecting said mounting means to said shaft for being driven thereby to so move said one of said stator and said rotor, and energizing circuit means for said coupling means responsive to the output of said generator.

9. The combination set forth in claim 8, wherein said coupling means comprises a clutch having working surfaces spaced apart by an air gap, one of said surfaces being driven by said shaft, and said energizing circuit means is operable to produce a variable magnetic force coupling said clutch surfaces across said last-named air gap.

10. The combination set forth in claim 1, wherein said actuating means are controlled by means including means responsive to the output voltage and the output current of said generator.

11. The combination set forth in claim 10, wherein said means controlling said actuating means also include means responsive to the output frequency of said generator.

References Cited in the file of this patent

UNITED STATES PATENTS 614,608   Cantono _____ Nov. 22, 1898